US009624949B2

(12) United States Patent
Caroom (10) Patent No.: US 9,624,949 B2
(45) Date of Patent: Apr. 18, 2017

(54) ALL-TERRAIN TRIPOD WITH AUTOMATICALLY EXTENDING AND RETRACTING LEGS (71) Applicant: Eliot Caroom, Palo Alto, CA (US)

(72) Inventor: Eliot Caroom, Palo Alto, CA (US)

( * ) Notice: Subject to any disclaimer, the term of this patent is extended or adjusted under 35 U.S.C. 154(b) by 0 days.

(21) Appl. No.: 15/040,244

(22) Filed: Feb. 10, 2016

(65) Prior Publication Data
US 2016/0230922 A1    Aug. 11, 2016

Related U.S. Application Data (60) Provisional application No. 62/114,625, filed on Feb. 11, 2015.

(51) Int. Cl.
F16M 11/38    (2006.01)
F16B 1/00     (2006.01)
F16M 11/28    (2006.01)
F16M 11/24    (2006.01)

(52) U.S. Cl.
CPC ............ F16B 1/00 (2013.01); F16M 11/242 (2013.01); F16M 11/28 (2013.01); F16M 11/38 (2013.01); F16B 2001/0028 (2013.01); F16B 2001/0035 (2013.01)

(58) Field of Classification Search
CPC ........ F16M 11/04; F16M 11/16; F16M 11/26; F16M 11/28; F16M 11/38; F16B 1/00; F16B 2001/0035; F16B 2001/0028
USPC ... 248/169, 171, 188.2, 188.5, 188.7, 188.8, 248/440, 188.6
See application file for complete search history.

(56) References Cited

U.S. PATENT DOCUMENTS

| 624,662 | A |   | 5/1899  | Leedy |
|---------|---|---|---------|-------|
| 1,064,798 | A |   | 6/1913 | Walte |
| 1,517,825 | A | * | 12/1924 | Bruneau ............... F16M 11/34 248/171 |
| 1,680,050 | A |   | 8/1928  | Keppens |
| 1,863,442 | A | * | 6/1932  | Goodman ............... E01F 9/688 116/63 R |
| 2,031,097 | A |   | 2/1936  | Bucky |
| 2,493,978 | A |   | 1/1950  | Kromer |
| 2,849,202 | A |   | 8/1958  | McCombs |

(Continued)

FOREIGN PATENT DOCUMENTS

| FR | 2852077 A1 | 9/2004 |
|----|------------|--------|
| GB | 320777     | 10/1929 |

Primary Examiner — Gwendolyn Baxter
(74) Attorney, Agent, or Firm — Brown & Michaels, PC (57) ABSTRACT A tripod having legs which automatically open and close when the device is placed on a support surface and removed from the support surface, respectively. The device includes a telescopic center post, a plurality of downwardly extending support legs, a plurality of coupling links pivotally attached at one end to a bottom end of the center post and pivotally attached at the other end to the bottom end of the support legs. The attachment of the coupling links to the support legs is linked at the bottom of the support legs so that the coupling serves as a foot on the support surface when extended. Hinge-type mechanisms between the coupling links and support legs allows the support legs to close to a vertical position parallel and adjacent to the center post while allowing the legs to automatically open when the tripod is placed on the support surface.

15 Claims, 6 Drawing Sheets (56) References Cited

U.S. PATENT DOCUMENTS

| | | | |
|---|---|---|---|
| 3,235,215 A * | 2/1966 | Lodde, Jr. | ............... E02D 29/14 |
| | | | 248/161 |
| 4,366,940 A * | 1/1983 | Vargas | ................... F16M 11/04 |
| | | | 248/170 |
| 4,705,251 A | 11/1987 | Samuelsson | |
| 5,319,365 A | 6/1994 | Hillinger | |
| 5,836,516 A | 11/1998 | Van Epps et al. | |
| 5,934,628 A | 8/1999 | Bosnakovic | |
| 7,137,608 B2 | 11/2006 | Willey | |
| 2005/0121569 A1 * | 6/2005 | Willey | ................... F16M 11/00 |
| | | | 248/168 |
| 2007/0235605 A1 | 10/2007 | Voelz | |

* cited by examiner

ALL-TERRAIN TRIPOD WITH AUTOMATICALLY EXTENDING AND RETRACTING LEGS

REFERENCE TO RELATED APPLICATIONS

This application claims one or more inventions which were disclosed in Provisional Application No. 62/114,625, filed Feb. 11, 2015, entitled "Tripod With Automatically Extending And Retracting Legs". The benefit under 35 USC §119(e) of the United States provisional application is hereby claimed, and the aforementioned application is hereby incorporated herein by reference.

BACKGROUND OF THE INVENTION

Field of the Invention

Generally, the invention pertains to a vertical support. More particularly, the invention pertains to a tripod having support legs which automatically open and close when the tripod is placed on a support surface and lifted from a support surface. This particular improved automatic tripod opens and closes reliably and fluidly with no special care or manipulation needed by the user, which makes it both convenient for consumers to instantly use without needing to fiddle with or adjust the device, and also reliable and therefore appropriate for use with expensive consumer electronics like a smartphone.

Description of Related Art

Tripods are commonly used by professionals in the video and photographic industries to support and stabilize equipment such as cameras, lights, and background screens, and by consumers for a multitude of products. Typically, tripods include at least three pivotally mounted support legs movable between open and closed positions. The support legs stabilize the tripod in a vertical position and prevent movement of the video equipment during filming. The tripods often have telescopic legs or a telescopic center post to allow a user to adjust the height of the equipment being mounted on the tripod. The legs of the tripod pivot to the closed position whereby all three legs extend generally adjacent and parallel to one another.

One problem with this type of prior art tripod is the often awkward process of pivoting the support legs to the open position. Support legs must be moved to the open position, telescopically adjusted to the proper height, and locked in place. Repeated adjustments may be necessary on uneven ground, or if the user is uncertain that the legs are properly adjusted. Simplified tripod bases can be opened more easily but often scrape on the ground or surrounding objects. They also are prone to catch as they fold open, or to open unevenly or in a position that isn't ready to bear weight, especially on uneven ground or in tight quarters.

I have found that adjustment of tripods is a burdensome step in the photography and videography process, especially for amateurs, who aren't as practiced in tripod use as professionals. This lack of familiarity is doubly challenging for amateurs as they also aren't as prepared as professionals for the constant challenge of videography and photography: quickly establishing and then maintaining a readiness to capture the moment, without concern about the readiness of peripheral equipment such as a tripod.

I see that is an increasingly important problem as more and more amateur photographers stop use of single-purpose cameras and video cameras and rely instead on smartphones, which of their nature encourage consumers to expect portability, instant readiness, and ease of use. While consumers in the 1980s, 1990s and early 2000s could commonly be seen in public shooting photo or video using a tripod, today almost no casual videographers such as soccer dads or vacationers can be seen using tripods with smartphone cameras.

Several prior art tripods have been developed which disclose a mechanism to open the support legs of a tripod or similar structure by use of telescoping columns, and by use of moveable legs attached to collars. These date back to 1899, when Leedy filed U.S. Pat. No. 624,662 for "Drum Stand," which had legs hinged in the middle, with a lower collar sliding on a central shaft. That tripod, like so many patented improved designs to come in the next century, offered users a telescoping pole with nesting columns in order to raise and lower the height of the object being supported. The collars to which the legs were mounted slid and adjusted on the exterior of the outer column. Those hinged legs attached to collars required users to secure them in place before use, and then to manually retract them after use to make the tripod device more compact for transport and storage.

U.S. Pat. No. 624,662 and US Publ. No. 2007/0235605 show either the upper collar, or the lower collar, slideably movable on the central column. The central column is often telescoping. The prior art does not proposes to affix the collars for the hinged legs to each of the telescoping columns, with the result of automatically opening and closing tripod legs that require no manual attention in the course of use. More than a century of tripod innovations has not included such an improvement.

In the last few decades, several patented inventions have sought to create automatically opening and shutting tripods, but they each present drawbacks in ease of use and reliability.

For example, U.S. Pat. No. 4,705,251 discloses a self-erecting tripod apparatus having three outwardly extending legs which are attached to a lower rod which telescopically engages an upper sleeve intermediate the three legs. When the center rod is lowered onto a support surface, the support legs are automatically extended to an outward open position and when the apparatus is lifted from the support surface the support legs will collapse to a closed position under the influence of gravity. A vertically slidable collar extends around the center rod and includes a plurality of links pivotally mounted to the collar and to the support legs. The support legs move between the open and closed positions as the bottom collar moves upwardly and downwardly, respectively, along the center rod.

The design of the '251 tripod automatically opens and retracts, but does so without the benefit of a base that is stable on a variety of surfaces. Its three feet and central pole, rigidly extended, amount to four small points of contact with the support surface. That does not allow for quick, reliable use on uneven surfaces such as hills, and in varied terrain including sand, grass, or foliage. Another problem with the '251 patent's design is that the legs must be angled outward even when the tripod is in the closed position. That makes the tripod unwieldy and able to snag on clothing. It also prevents the tripod from being easily transported in a bag with other items, given that the outwardly angled legs could catch on the bag or other items when the tripod is removed.

A second, more recent example, U.S. Pat. No. 5,934,628 discloses a similar self-erecting tripod apparatus which automatically opens when the tripod is placed on a support surface and automatically closes when the tripod is lifted from the support surface. It has many of the same problems as '251 that would preclude an amateur video user from confidently placing it on a variety of surfaces.

One problem with the '628 design is that the legs extend with the feet in close proximity to the support surface, such as the ground. That means the user must carefully manipulate the tripod so it opens without scraping the ground. The legs extend jerkily and with feet close to the ground due to the design's coupling links, the feet are pivotally attached at one end to a bottom end of the center post and pivotally attached at the other end to the center of the support legs, not the bottom end of the support leg. It is unsuitable for uneven surfaces such as grass or turf due to the angle at which the legs extend, offering little clearance from the ground.

Therefore, the need exists for a tripod having support legs which automatically open and close when the tripod is placed on a support surface and when removed from the support surface, respectively, which allows the support legs to close to a vertical position parallel and adjacent to the center post when in the closed position, and which does so with legs opening upwards and downwards, firmly landing on a variety of support surfaces.

SUMMARY OF THE INVENTION

The tripod or vertical support of the present invention has support legs which automatically open when the tripod is placed on a support surface and automatically shuts, or retracts, when the tripod is removed from the support surface, respectively.

The tripod includes a telescopic center post, a plurality of downwardly extending support legs, a plurality of coupling links pivotally attached at one end to a bottom end of the center post and pivotally attached at the other end to the bottom end of the support legs. The attachment of the coupling links to the support legs is linked at the bottom of the support legs so that the coupling serves as a foot on the support surface when extended. Hinge-type mechanisms between the coupling links and support legs allows the support legs to close to a vertical position parallel and adjacent to the center post while allowing the legs to automatically open in a downwards direction as the tripod is placed on the support surface.

The support legs extend vertically, parallel and adjacent to a center post of the tripod when in the closed collapsed position, such that the tripod requires a relatively small amount of space to store and transport. Coupling links extend between the support legs and the center post in the tripod and coupling links are connected by hinges or similar mechanisms to the bottom of the support legs to allow a smooth downward opening motion to allow easy use on a variety of surfaces.

The tripod of the present invention uses the force of gravity to automatically close the support legs, and does so unimpeded by substantial overall friction, or by individual parts that may often catch or falter because of friction.

The tripod of the present invention may be used in conjunction with: a further telescoping mechanism to adjust height; a conventional gooseneck mechanism; a conventional pincer or other mechanism to hold small electronic devices such as smartphones or cameras; and a protective mechanism such as a cage to shield aforementioned electronic devices from striking the ground if the tripod falls.

DETAILED DESCRIPTION OF THE INVENTION

The tripod of the present invention is easy to deploy and retract one-handed, which permits the user to both deploy the tripod one-handed, and retract the tripod one-handed simply by picking it up. This convenient attribute allows for immediate, unfettered use, which makes it a more universally useable product than other tripods, and permits more complex operations to be performed by novice videographers or photographers, who can focus on the operations of photo and video devices 26 such as smartphones with complex apps, because they don't need to think about their tripod.

The tripod of the present invention is also reliable on a variety of surfaces. IL does so by connecting the pivotal attachment of the coupling links to the support legs at the bottom of the legs by hinges or other similar mechanism. That allows the support legs to move to an open position by descending downwards towards the support surface. The downward landing angle makes the tripod more reliable than devices with legs that extend outwardly with a degree of horizontal motion.

Furthermore, by allowing the support legs to open with a downward angle of motion, the tripod of the present invention works smoothly and offers users greater confidence in its reliability. When fully deployed, legs of the present invention contact the ground along the lower length of the hinge, which provides a larger contact area between ground and tripod, increasing stability in varied terrain.

Figure 1A:
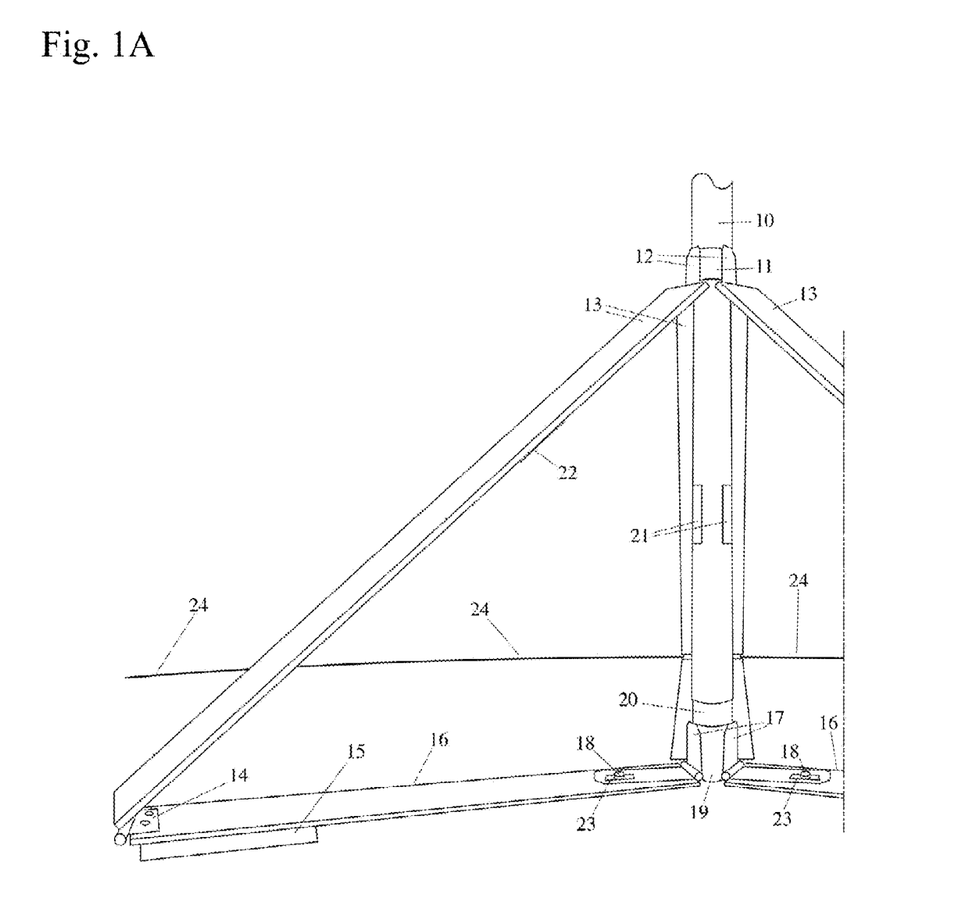
FIG. 1A shows a perspective view of one side of the tripod, with one leg folded in its open, deployed support position, resting on a support surface on the left side of the drawing, and with another leg partly visible on the other side of the pole.
Figure 1B:
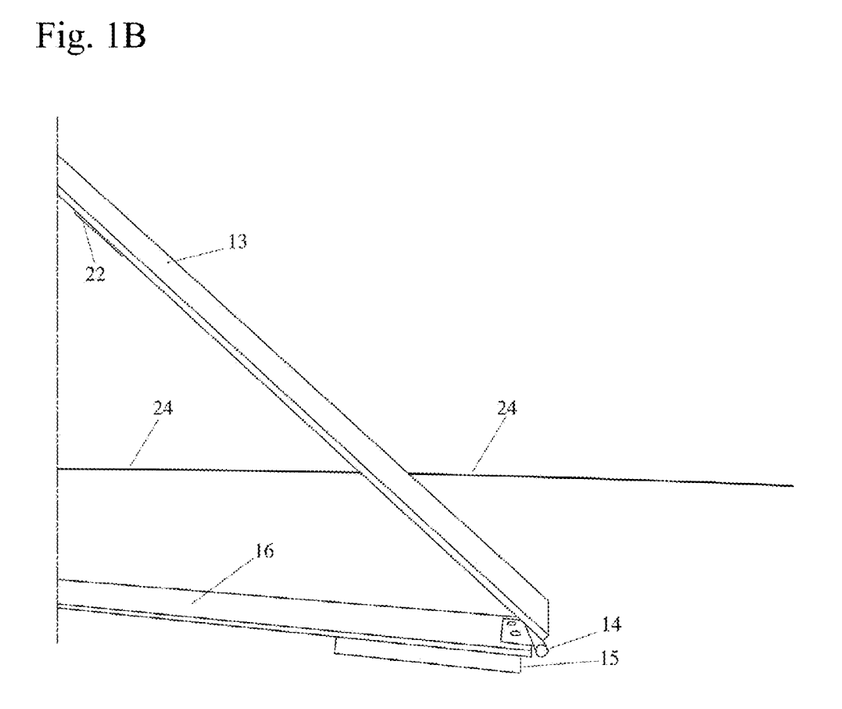
FIG. 1B shows the remaining deployed support leg.

FIGS. 1A and 1B, spread across multiple sheets, together show a perspective view of a first embodiment of the tripod or vertical support. In this embodiment an upper telescoping pole segment, 10 is shown in a partial view that shows its connection to upper collar 11, omitting the continuation of the pole upwards. Two upper hinges 12 are shown affixed to upper collar 11 and to upper legs 13. Those upper legs 13 descend and connect at the level of the support surface 24 to a set of middle hinges 14.

The middle hinges 14 connect to lower legs 16, which each have a gripping foot surface 15. The gripping foot surface may be made from rubber or another gripping-textured material. The gripping foot surfaces 15 are on the lower legs' 16 outer side which faces the support surface 24.

The lower legs 16 run inward to lower hinges 17, which are held in place by fasteners 18 that are seated in a slot-shaped space 23 that allows some movement of the fastener 18 in the hinges 17. The lower hinges 17 are affixed to a lower collar 19, which is in turn affixed to a lower telescoping pole segment 20, most of which is not shown, as it is telescoped inside of the upper telescoping pole segment 10.

On the upper, inner portions of upper legs 13, thin lines in FIGS. 1A and 1B illustrate outer quick-release fasteners 22 that may be fasteners such as a magnet, or one side of a hook and loop fastener. In FIG. 1A the inner quick-release fasteners 21 are located in a central area of the upper telescoping pole segment 10, just below upper hinges 12. The inner fasteners 21 may be fasteners such as a magnet or a piece of hook and loop fastener.

The upper legs 13 and lower legs 16 may be made from strips of a flexible, yet sturdy material such as polycarbonate, which is known by brand names including Lexan® and Tuffak®, although other materials are also suitable.

Figure 2:
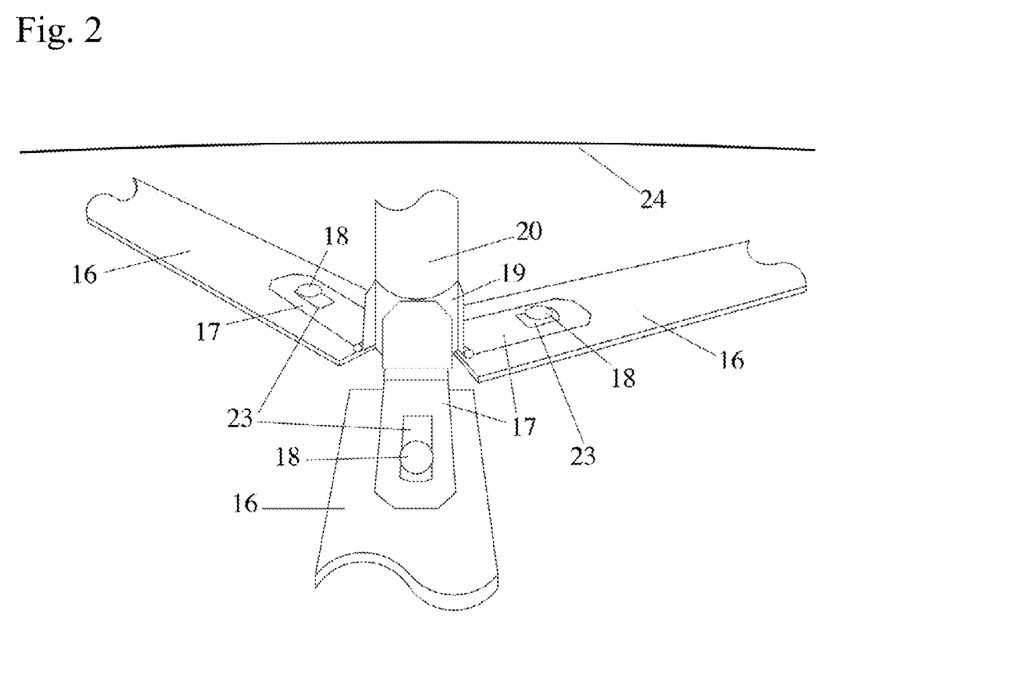
FIG. 2 shows a perspective view of one portion of the fully opened tripod, the lower hinges and legs at their point of attachment to the lower pole collar.

FIG. 2 shows a larger perspective view from a different angle, with one of lower legs 16 heading away from lower telescoping pole segment 20 towards the viewer. Lower hinges 17 are shown with the slot-shaped cutaways 23 that allow hinges 17 "wiggle room" at the anchor point of lower legs 16 as the fastener 18 can move laterally within the slot-shaped space 23 in the hinge surface. The lower hinges 17 seen in FIG. 2 are fixed to lower collar 19, which in turn, is fixed to lower telescoping pole segment 20.

Figures 3A, 3B:
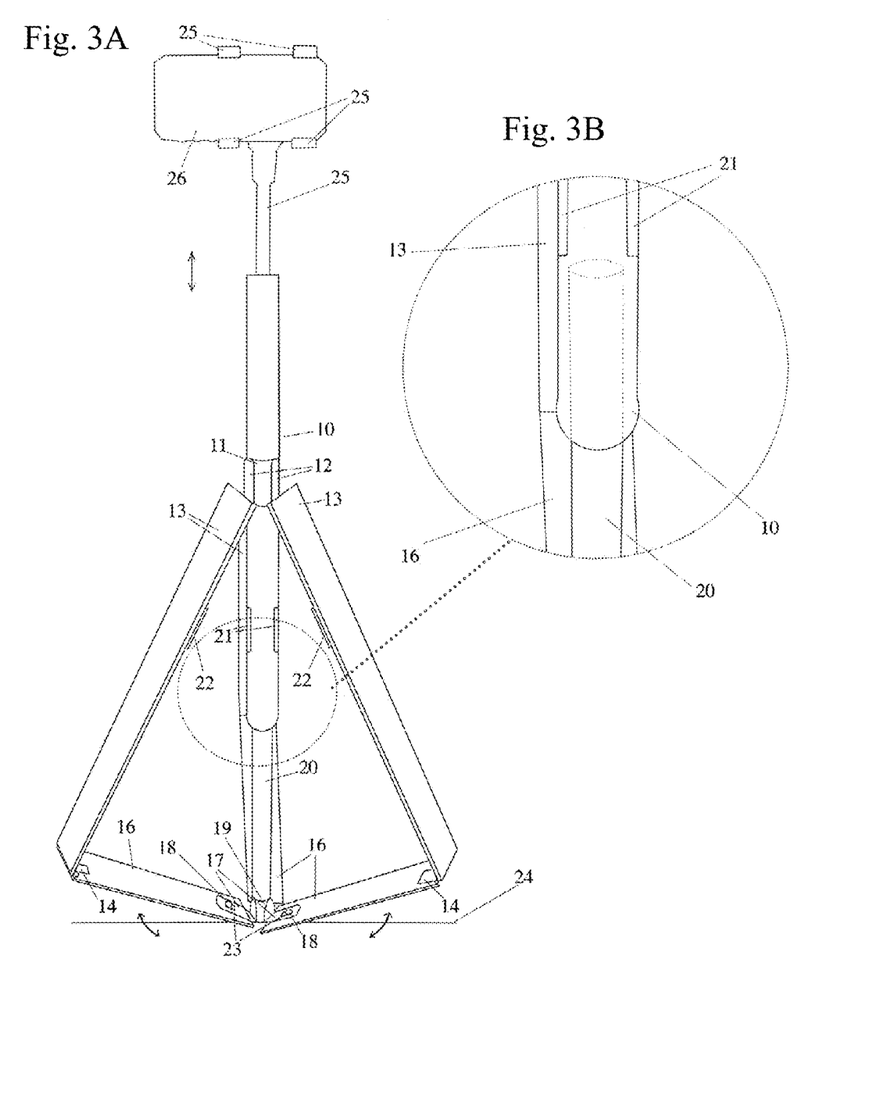
FIG. 3A shows a perspective view of the tripod's legs as they appear while opening or shutting.
FIG. 3B shows a close up of a sectional view of telescoping pole segments, where the upper pole segment is over the lower pole segment.

Upper pole segment 10 is connected to an attachment device 25 that holds a smartphone or other camera or device 26 in place and/or permits easy adjustment to the direction or aim of the smartphone or other camera—for example a pincer device or a gooseneck device or other such device as shown in FIG. 3A. The tripod or vertical support device may also be comprised of a second telescoping or otherwise adjustable conventional mechanism to raise or lower the height of the smartphone or other camera, without changing the function of the tripod depicted in FIGS. 1-5B. The tripod or vertical support device may also have a conventional hook (not shown) to allow the tripod to be hung from objects such as a fence, bookcase, golf bag, or cart, so that the device remains in the closed and extended position while awaiting its next use.

Referring to FIGS. 3A-3B, the support's upper telescoping pole segment 10 is moved upward so that a larger area of lower telescoping pole segment 20 can be seen. Upper legs 13 are nearer to the upper telescoping pole segment 10, as they've been brought inwards, with upper collar 11 and upper hinges 12 moved upwards. The lower legs 16 are closer to lower telescoping pole segment 20, as middle hinges 14 connecting upper and lower legs 13, 16 have moved upwards, and inward toward the upper and lower telescoping pole segments 10, 20 at the center of the vertical support device or tripod.

Figures 5A, 5B:
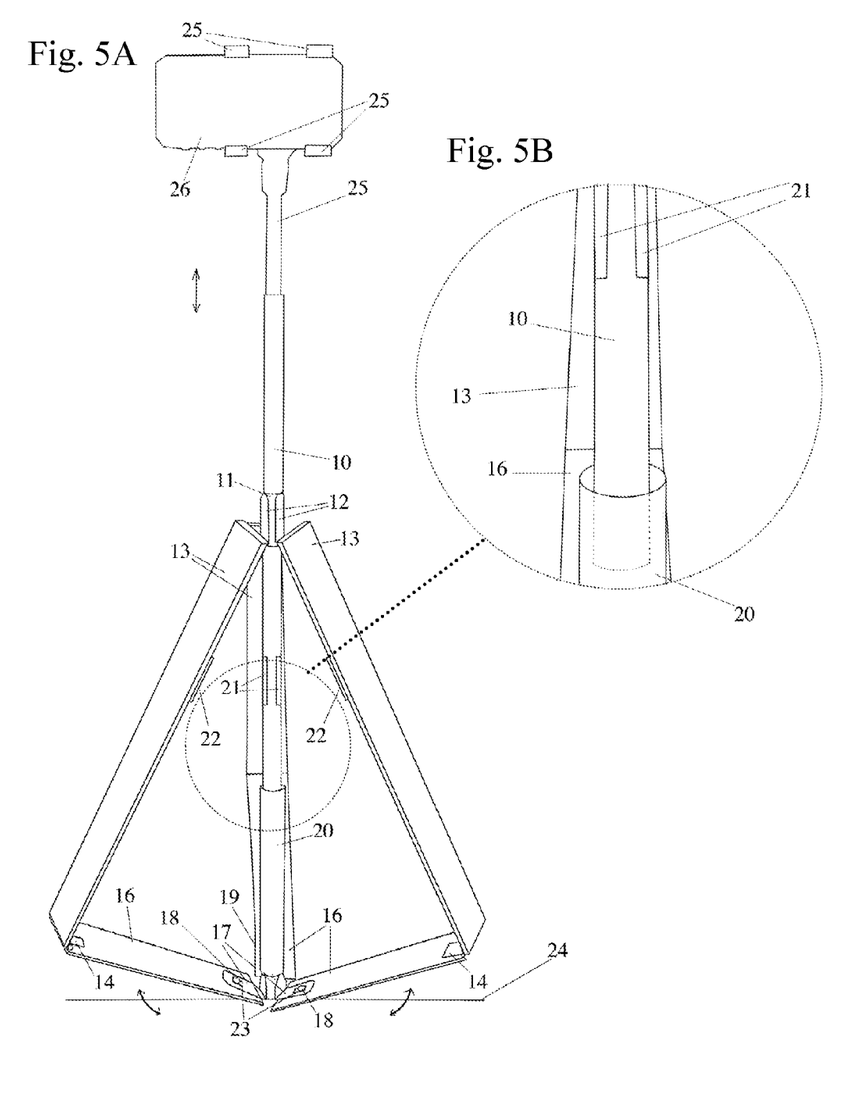
FIG. 5A shows a perspective view of the tripod's legs as they appear while opening or shutting of an alternate embodiment.
FIG. 5B shows a close up of a sectional view of the telescoping pole segments, where the lower pole segment is over the upper pole segment.

FIGS. 5A-5B show an alternate embodiment of FIGS. 3A-3B in which the lower telescoping pole segment 20 can telescope and overlap the upper telescoping pole segment 10.

OPERATION

Figure 4:
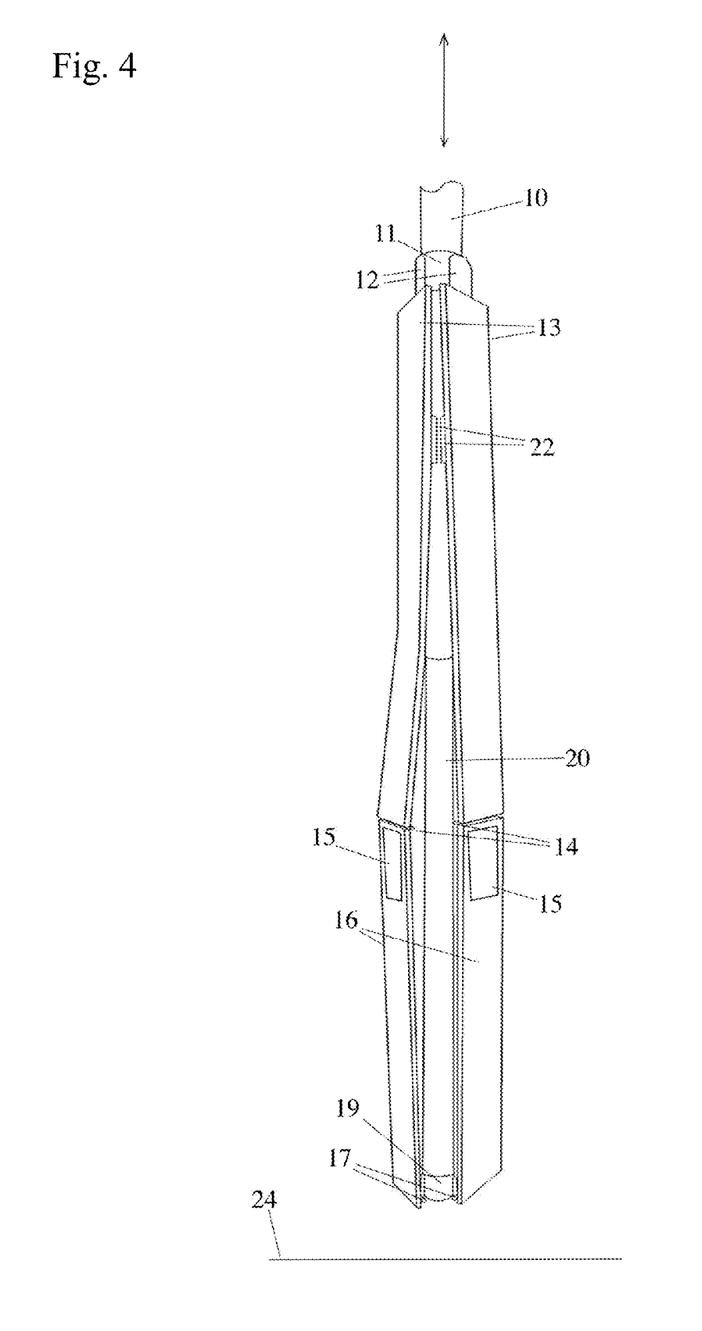
FIG. 4 shows a perspective view of the tripod in its retracted, elongated form, with legs flush to the central telescoping pole segments.

When the support is in its fully extended, closed position, seen in FIG. 4, upper legs 13 are touching or approximately flush to the upper telescoping pole segment 10. Some bend is seen in upper legs 13, and the edge of outer quick-release fasteners 22 can be seen as they are touching inner quick-release fasteners, 21, in a fastened position. The upper legs 13 are held against the central pole's upper telescoping pole segment 10 by inner quick-release fasteners 21, such as magnets or hook and loop fasteners, which, attached to the upper telescoping pole segment 10, stick to or fasten to the outer quick-release fasteners 22.

Lower legs 16 are also held in close proximity to lower telescoping pole segment 20 because of the force of gravity, which is pulling downward on the lower telescoping pole segment 20, as well as the adherence of the upper telescoping pole segment 10 and upper legs 13 due to the quick-release fasteners 21, 22. The lower telescoping pole segment 20 is fully extended, with the most surface area visible in the device's operation. Below middle hinges 14, which are mostly obscured by the legs, gripping foot surfaces 15 can be seen on the exterior of the tripod. A large area of lower leg 16 is visible, as the tripod is fully extended vertically.

When someone using the device intends to open it, the device is placed on a support surface 24 such as grassy ground, wooden floor, or a sandy surface. Then, as seen in FIG. 3, when lower pole segment 20 lands on or contacts the support surface 24, lower hinges 17 bend outward as lower legs 16 move outward and downward. This forcefully separates outer quick-release fasteners 22 on upper telescoping pole segment 10, from the inner quick-release fasteners 21 on the interior side of upper legs 13. The upper pole telescoping pole segment 10 telescopes, overlapping lower telescoping pole segment 20, and the upper legs 13 move outwards and downwards at the same time that the lower legs 16 move outwards and downwards.

When the legs are fully deployed, as seen in FIGS. 1A, 1B and 2, connected upper legs 13 and lower legs 16 move downwards until gripping foot surfaces 15 on each leg land on or contact the support surface 24. The foot surfaces 15, made out of a gripping material such as rubber, contact the support surface 24, and so can a portion of the lower legs 16. As the lower legs 16 descend to the support surface 24 and settle in place, the lower legs can flex to land in a secure position on a variety of terrains, because they are made of flexible, sturdy material such as the previously mentioned polycarbonate.

The lower legs 16 are also able to flex and have "wiggle room" due to the slot-shaped spaces 23 in lower hinges 17, which allow movement of fasteners 18 that connect those hinges to lower legs 16. The slot shaped space 23 allows the lower legs 16 to move slightly while still held in place by the fastener 18, which can move in a straight line in the slot-shaped space 23.

When the user wants to pick up the tripod or vertical support device, the operation is reversed: the device is lifted by upper pole segment 10, and the weight of the lower pole segment 20 causes the upper and lower telescoping pole segments to telescope to their extended positions. The force of that movement pushes lower legs 16 downwards until outer quick-release fasteners 22 on upper legs 13 contact inner quick-release fasteners 21, which ensure that the upper legs 13 (and the lower legs 16) are held tight to the pole segments until the next time the device is lowered to a support surface 24.

The tripod or vertical support device is a more reliable tripod to simply deploy and retract automatically, with no manual adjustment required and by simple forces of gravity and adhesion. The legs of the tripod not only open swiftly, they also open surely, by means of a downward trajectory that the legs follow and component parts that adjust to irregular terrain and slopes.

The large surface area of the legs which land on the support surface 24 offer more stability than existing supports and tripods, which rely on legs each with a single point of contact. The hinged or otherwise frictionless joints that affix the upper and lower legs of the present invention open without catching or jamming.

While the above description contains many specificities, these should not be construed as limitations on the scope of any embodiment, but as exemplifications of the embodiment thereof. Many variations are possible within the teachings of the embodiment. For example, the tripod may have any plurality of legs. It may also have various parts to allow stowing of the device in a closed position when not in use, such as a strap, or a drawstring, or a latch. Other variations include a hook to allow the tripod to be hung off of large objects like fences or golf carts.

In another embodiment the legs may be made of materials besides polycarbonate.

In another embodiment, springs or similar mechanisms are used to allow the legs room to make minor movements to adjust to a support surface, instead of the slot-shaped space and slideable fastener in the present embodiment. In another embodiment, a ball bearing may be used to allow the legs room to make minor adjusting movements to settle on a support surface.

In another embodiment, a bolt, screw, ball bearing or other connection capable of providing the upper and lower legs an axis to rotate on or rotatable connection may be used, rather than using a hinge to achieve largely frictionless opening and closing. In yet another embodiment, a protective cage or buffer material may be used around the smartphone or camera at the top of the tripod, to protect it if the device were knocked over.

In another embodiment, a locking mechanism that would hold the valuable smartphone or camera locked into the tripod unless released by key or combination code. An additional variation is that the upper collar may be adjustable to slide upwards to make the device more compact for shipment or storage. Still further variations may include an attached means to charge or power smartphones or cameras while in use on the tripod. Likewise, another variation would allow the device to be used as a signal booster for smartphones and other internet-connected devices.

In other embodiments the tripod or vertical support device could be useful as a base for a cane or other device to assist steady walking. In alternate embodiments, the tripod or vertical support device could be useful for electronic or internet-connected equipment besides smartphones, cameras, and video cameras.

REFERENCE NUMBERS 10 upper telescoping pole segment
11 upper collar
12 upper hinge
13 upper leg
14 middle hinge
15 gripping foot surface
16 lower leg
17 lower hinge
18 fastener
19 lower collar
20 lower telescoping pole segment
21 inner quick-release fastener
22 outer quick-release fastener
23 slot shaped space
24 support surface
25 attachment device
26 photo/video device Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A vertical support device for holding another device a height above a surface comprising:
    a telescoping center pole having an upper end and a lower end, the telescoping center pole comprising a lower pole segment with a lower collar and an upper pole segment with an upper collar, the upper pole segment telescopically sliding over the lower pole segment or the lower pole segment telescopically sliding over the upper pole segment;
    a plurality of upper legs fastened to the upper collar on the upper pole segment by an upper rotatable connection; and
    a plurality of lower legs fastened to the lower collar on the lower pole segment by a lower rotatable and to the upper legs by a middle rotatable connection;
    wherein in a first position of the vertical support device, the plurality of upper legs are in at least partial contact with upper pole segment and the lower pole segment is telescopically fully extended; and
    wherein in a second position of the vertical support device, the upper legs are bowed outwards from the center pole and the lower end of the telescoping center pole and the lower legs contact the surface;
    wherein movement between the first position and the second position occurs when the lower end of the lower pole segment of the telescoping center pole comes into contact with surface, forcing separation of the upper legs from the center pole, such that the upper pole segment telescopes relative to the lower pole segment, bowing the upper legs and lower legs outwards until the lower legs contact the surface.

2. The vertical support device of claim 1, wherein the another device is device which captures images.

3. The vertical support device of claim 1, wherein the plurality of lower legs further comprise a gripping surface which contacts the surface when the vertical support device is in the second position.

4. The vertical support device of claim 1, wherein the lower rotatable connection is a hinge comprising a slot for receiving a fastener, fastening a lower leg to the lower collar.

5. The vertical support device of claim 4, wherein the slot is slightly larger than the fastener, allowing movement of the fastener relative to the slot.

6. The vertical support device of claim 1, wherein the upper rotatable connection is a hinge further comprising a slot for receiving a fastener, fastening an upper leg to the upper collar.

7. The vertical support device of claim 6, wherein the slot is slightly larger than the fastener, allowing movement of the fastener relative to the slot.

8. The vertical support device of claim 1, wherein the upper legs further comprise a fastener for mating with a corresponding fastener attached to the center pole, fastened the upper legs to the center pole in the first position.

9. The vertical support device of claim 8, wherein the separation between the upper legs and the center pole during movement between the first position and the second position further comprises decoupling the fastener on the upper legs from the fastener on the center pole.

10. The vertical support device of claim 8, wherein the fasteners are selected from a group consisting of magnets and hook and loop fastener.

11. The vertical support device of claim 1, wherein the upper legs and lower legs are made of a flexible material to absorb shock and provide flexibility when resting on the surface.

12. The vertical support device of claim 1, wherein the another device is attached to upper end of the vertical support device by an attachment device.

13. The vertical support device of claim 1, wherein movement between the first position and second position is automatic with minimal friction.

14. The vertical support device of claim 1, wherein the surface is comprised of varied, uneven terrain.

15. The vertical support device of claim 1, wherein the lower legs have a width which is greater than a width of the upper legs to provide a greater stability when the lower legs contact the surface.

\* \* \* \* \*